: US 7,442,009 B2
(45) Date of Patent: Oct. 28, 2008

(12) United States Patent
Arel (54) DRIVING DEVICE FOR RAISING OR LOWERING AN AIRFOIL

(75) Inventor: David V. Arel, Granby, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 224 days.

(21) Appl. No.: 11/327,813

(22) Filed: Jan. 6, 2006

(65) Prior Publication Data

US 2007/0160473 A1   Jul. 12, 2007

(51) Int. Cl.
    *F03D 11/04* (2006.01)
(52) U.S. Cl. .................................................... 416/142
(58) Field of Classification Search .............. 416/11, 416/142, 146 R, 244 A, 244 R, 246, DIG. 6
    See application file for complete search history.

(56) References Cited

U.S. PATENT DOCUMENTS

| 2,177,801 | A | * | 10/1939 | Erren ........................ 290/55 |
| 3,883,750 | A |   | 5/1975 | Uzell, Jr. |
| 4,266,911 | A | * | 5/1981 | Helm et al. .................... 416/9 |
| 4,311,434 | A |   | 1/1982 | Abe |
| 4,342,539 | A | * | 8/1982 | Potter ............................ 416/9 |
| 4,565,929 | A | * | 1/1986 | Baskin et al. ................. 290/44 |
| 4,616,974 | A | * | 10/1986 | Andruszkiw et al. ......... 415/4.3 |
| 5,182,458 | A |   | 1/1993 | McConarchy |
| 5,497,962 | A | * | 3/1996 | Wood ........................ 244/116 |
| 6,193,464 | B1 |   | 2/2001 | Nyhus et al. |
| 6,278,198 | B1 |   | 8/2001 | Willis et al. |
| 6,357,549 | B1 |   | 3/2002 | Brennan et al. |
| 6,505,785 | B2 |   | 1/2003 | Willis et al. |
| 6,522,025 | B2 |   | 2/2003 | Willis et al. |
| 2004/0169376 | A1 | * | 9/2004 | Ruer et al. ..................... 290/55 |

OTHER PUBLICATIONS

Search Report and Written Opinion for PCT/US2007/00416; filed Jan. 5, 2007.

* cited by examiner

*Primary Examiner*—Edward Look
*Assistant Examiner*—Nathaniel Wiehe
(74) *Attorney, Agent, or Firm*—Kinney & Lange, P.A.

(57) ABSTRACT

A wind turbine assembly with a driving device for raising and lowering a wind turbine between a lower end and an upper end of a wind turbine tower comprises a guide member extending longitudinally along the outer surface of the tower, a sleeve member coupled to the wind turbine, and means for raising and lowering the sleeve member between the upper end and the lower end of the tower along the guide member. The sleeve member has an inner diameter that is larger than an outer diameter of the tower, and is slidably coupled to the tower. The sleeve member also includes a slot configured to engage with the guide member.

13 Claims, 8 Drawing Sheets

DRIVING DEVICE FOR RAISING OR LOWERING AN AIRFOIL

BACKGROUND OF THE INVENTION

The present invention relates generally to an airfoil, such as a wind turbine, mounted on a wind turbine tower. More particularly, the present invention relates to a wind turbine that is easily raised atop and lowered from a wind turbine tower.

In the past, typical wind turbine technology placed the turbine shaft, gearbox, and electrical generator in a wind turbine housing at the top of a tower. This arrangement requires a tall crane to lift the wind turbine housing and place it atop the tower during initial construction. The crane is also required to lower the housing whenever major maintenance, such as blade or gearbox replacement, is required, or during periods of inclement weather. Having to bring in a crane to lower the housing from the tower is not only inefficient, but the associated wind turbine down time is very costly as well. Because of the difficulties associated with lowering the wind turbine housing from the tower, one solution has been to design wind turbines that can withstand severe loads such as those caused by hurricanes. This has the effect of increasing the weight of the components and the overall cost of the wind turbine assembly. In addition, the increased weight of the components makes it more difficult to perform maintenance at the top of the tower.

Thus, there exists a need for a wind turbine assembly that includes a driving device for raising and lowering a wind turbine between an upper end and a lower end of a wind turbine tower, as well as a structure for protecting the wind turbine while in a lowered position.

SUMMARY OF THE INVENTION

The present invention is a wind turbine assembly with a driving device for raising and lowering a wind turbine between a lower end and an upper end of a wind turbine tower. The driving device comprises a guide member extending longitudinally along the outer surface of the tower, a sleeve member coupled to the wind turbine, and means for raising and lowering the sleeve member between the upper end and the lower end of the tower along the guide member. The sleeve member has an inner diameter that is larger than an outer diameter of the tower, and is slidably coupled to the tower. The sleeve member also includes a slot configured to engage with the guide member.

DETAILED DESCRIPTION

Figure 1:
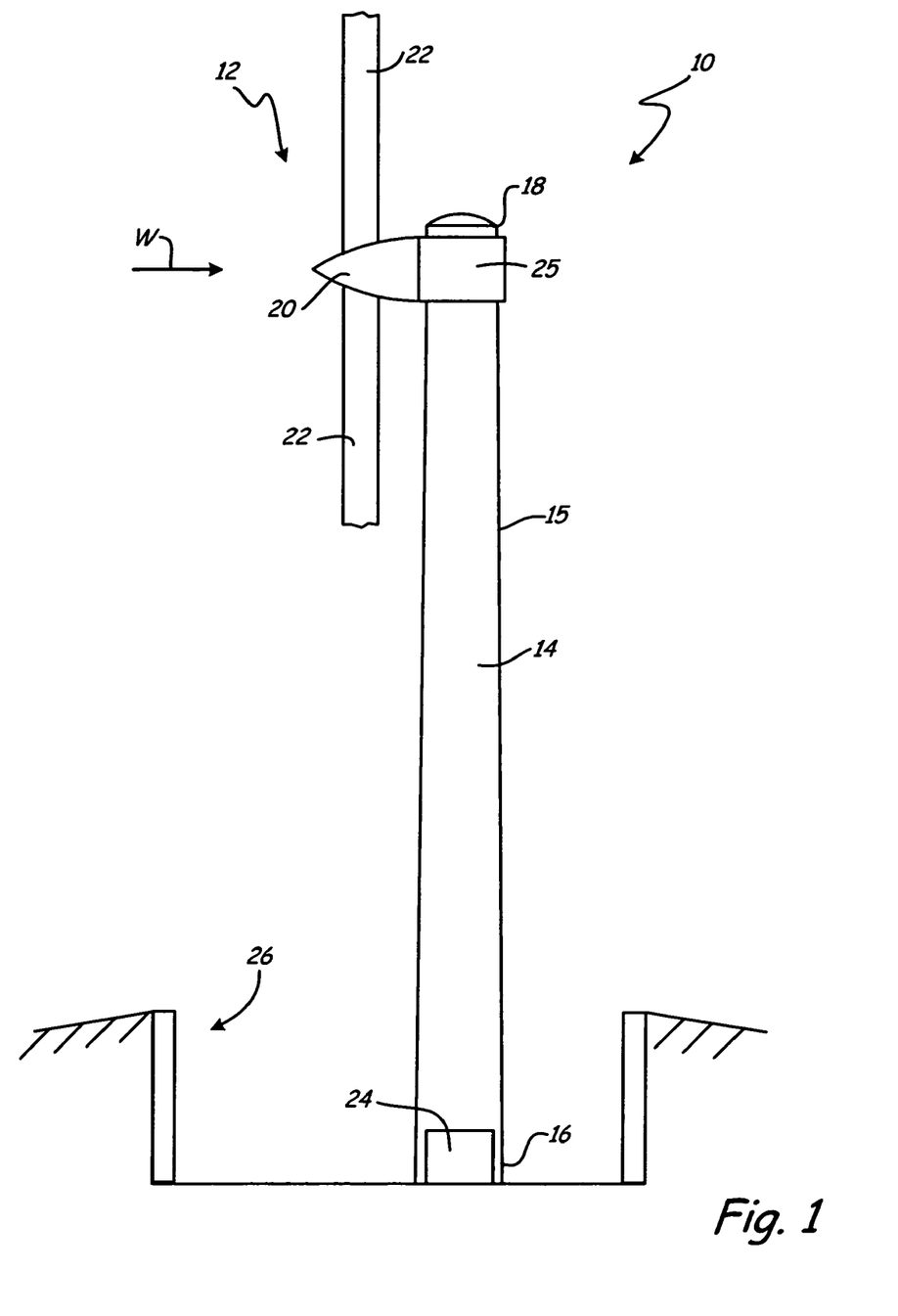
FIG. 1 is a side view of a wind turbine assembly of the present invention.

FIG. 1 is a preferred embodiment of a wind turbine assembly of the present invention. Wind turbine assembly 10 includes wind turbine 12 and wind turbine tower 14 fixedly attached to a ground surface. Wind turbine tower 14 has outer surface 15, lower end 16, and upper end 18. As shown in FIG. 1, wind turbine 12 is positioned near upper end 18 of wind turbine tower 14. Wind turbine 12 includes conical turbine housing 20 and blades 22. Conical turbine housing 20 houses a number of components of wind turbine 12 such as a turbine hub, turbine bearings, a turbine shaft, generator magnets, and generator coils.

Blades 22 of wind turbine 12 are configured to rotate about conical turbine housing 20 when positioned in a path of oncoming wind W. Blades 22 can have a suitable airfoil shape. As blades 22 are rotated by wind W, wind turbine 12 converts the mechanical motion of blades 22 into electric power.

Wind turbine assembly 10 further includes driving device 24 for raising or lowering wind turbine 12 along a longitudinal length of wind turbine tower 14. Driving device 24 includes sleeve member 25, which has an inner diameter that is slightly larger than an outer diameter of wind turbine tower 14. As a result, sleeve member 25 fits around and is slidably connected to wind turbine tower 14. In the preferred embodiment, a plurality of bushings or bearings are positioned between sleeve member 25 and wind turbine tower 14 to reduce the friction present in the slidable connection. Wind turbine 12 is rigidly attached to sleeve member 25. Therefore, as sleeve member 25 is driven up and down along the longitudinal length of wind turbine tower 14 between lower end 16 and upper end 18, wind turbine 12 is raised atop and lowered from wind turbine tower 14.

Driving device 24 provides a fast and efficient way to raise wind turbine 12 atop wind turbine tower 14 in order to generate electricity, or lower wind turbine 12 from wind turbine tower 14 when desired. There exist several important reasons why it may be desirable to lower wind turbine 12 from wind turbine tower 14 including, but not limited to, the need to service wind turbine 12 at ground level, and the need to store wind turbine 12 at or below ground level during periods of inclement weather.

As shown in FIG. 1, the preferred embodiment of wind turbine assembly 10 also includes protective chamber 26. Although protective chamber 26 is not a necessary feature of wind turbine assembly 10, it does provide additional protection and security when wind turbine 12 is in a lowered position.

Figure 2:
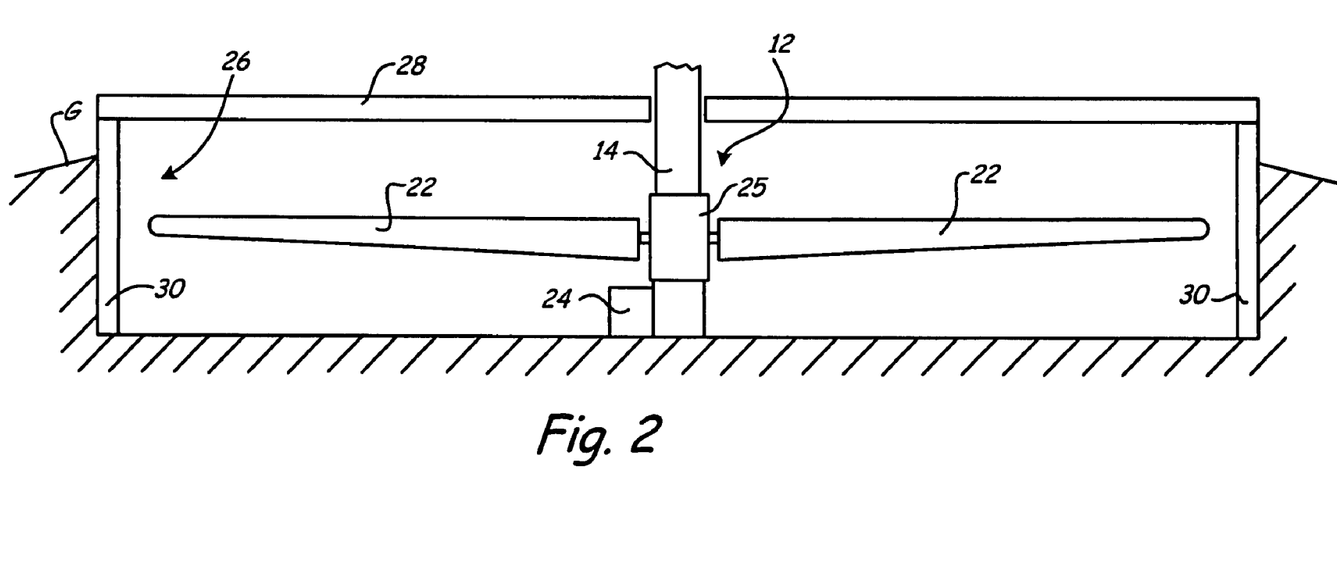
FIG. 2 is a rear view of a wind turbine of the present invention lowered into a protective chamber.

FIG. 2 is a rear view of wind turbine 12 lowered into protective chamber 26, which is shown as being located below ground level G. In an alternative embodiment, protective chamber 26 may be positioned above ground level G. Regardless of its position, protective chamber 26 provides protection from wind, rain, and various other elements, as well as a safe and secure location for wind turbine 12 while in a lowered position.

To increase the security and protection provided by protective chamber 26, protective chamber lid 28 may be placed atop protective chamber walls 30 to completely enclose wind turbine 12. In addition, a locking means may be used to secure protective chamber lid 28 to protective chamber 26. The locking means functions to both fixedly attach protective chamber lid 28 to protective chamber 26, and to limit unauthorized access to wind turbine 12 and its components.

Figure 3:
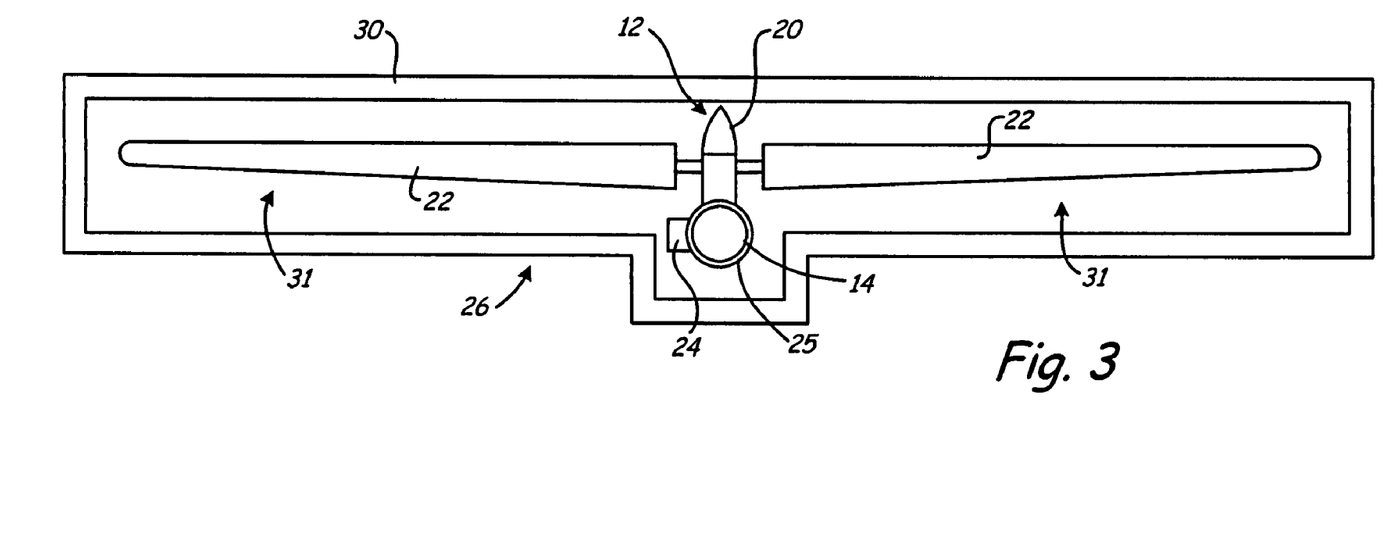
FIG. 3 is a top view of the wind turbine of the present invention lowered into the protective chamber.

FIG. 3 is a top view of wind turbine 12 lowered into protective chamber 26. In the preferred embodiment, protective chamber walls 30 surround wind turbine 12 on all sides. Protective chamber 26 includes a pair of blade storage portions 31 extending in the same general longitudinal direction as blades 22. Furthermore, protective chamber 26 is preferably of a sufficient size to enable a technician to maneuver around wind turbine 12 during turbine maintenance.

Figure 4:
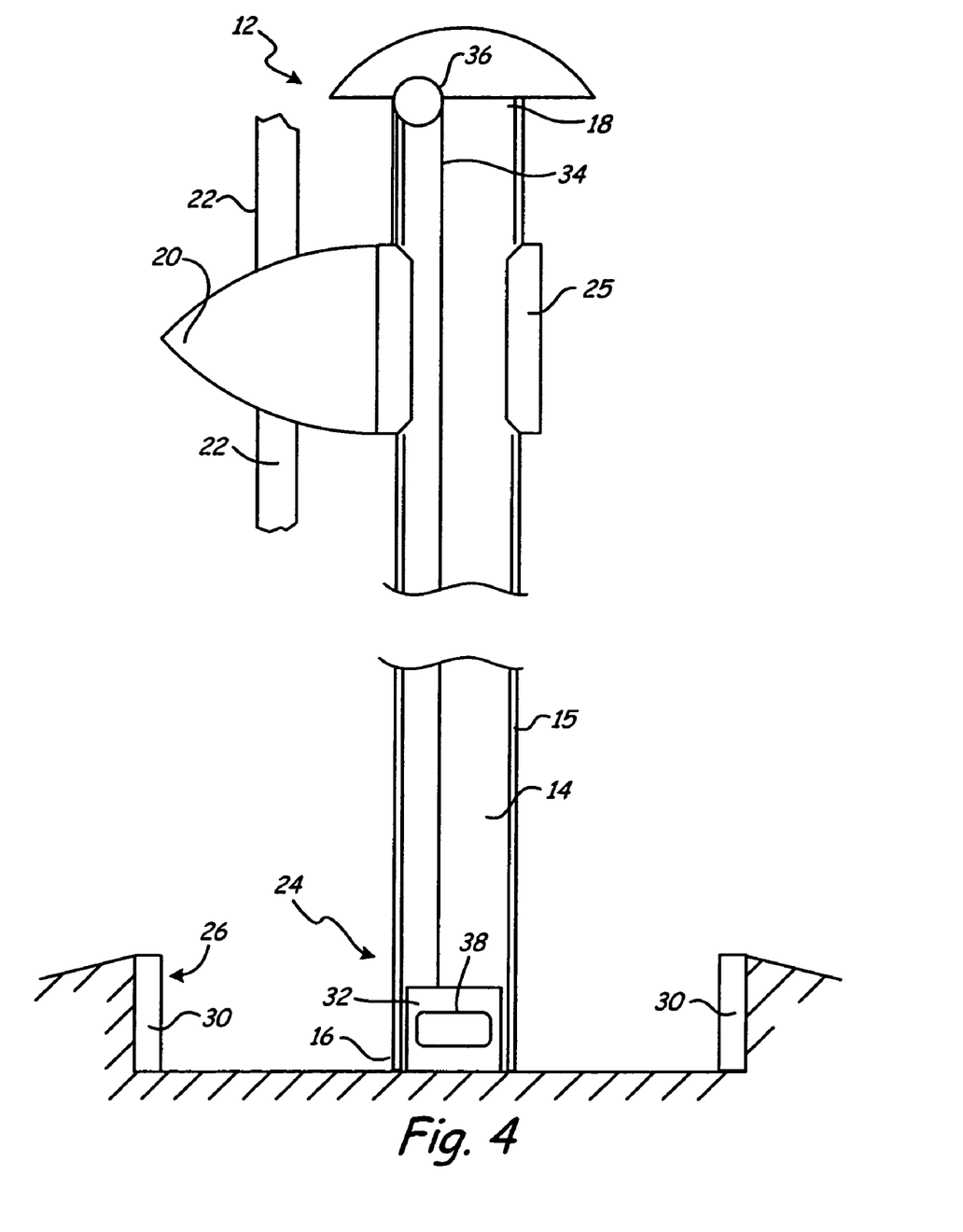
FIG. 4 is a cross-sectional view of a driving device for raising or lowering the wind turbine along a wind turbine tower.

FIG. 4 is a cross-sectional view of one embodiment of driving device 24, which includes sleeve member 25, winch 32, cable 34, and pulley 36. Cable 34 is attached on a first end to winch 32, and on a second end to sleeve member 25. Particularly, cable 34 extends longitudinally along wind turbine tower 14 from lower end 16 to upper end 18. At upper end 18 of wind turbine tower 14, cable 34 engages pulley 36.

To raise wind turbine 12 up from protective chamber 26, winch 32 winds cable 34 onto spool 38, thereby raising sleeve member 25 and attached wind turbine 12 toward upper end 18 of wind turbine tower 14. Pulley 36 rotates in a clockwise direction while winch 32 winds cable 34 onto spool 38, and serves as a guide for cable 34.

To lower wind turbine 12 from upper end 18 of wind turbine tower 14, winch 32 unwinds cable 34 from spool 38, thereby lowering sleeve member 25 and attached wind turbine 12 toward lower end 16 of wind turbine tower 14. When lowering wind turbine 12, pulley 36 rotates in a counter-clockwise direction while winch 32 unwinds cable 34 from spool 38.

In alternative embodiments, devices other than pulley 36 may be used to provide guidance while winding or unwinding cable 34. For example, a rotating shaft, a fixed shaft with a low-friction outer surface, or a bearing may be substituted for pulley 36 without affecting the operation of driving device 24. Furthermore, winch 32 may comprise any type of winch capable of winding and unwinding cable 34, such as an electric or hydraulic winch.

Figure 5:
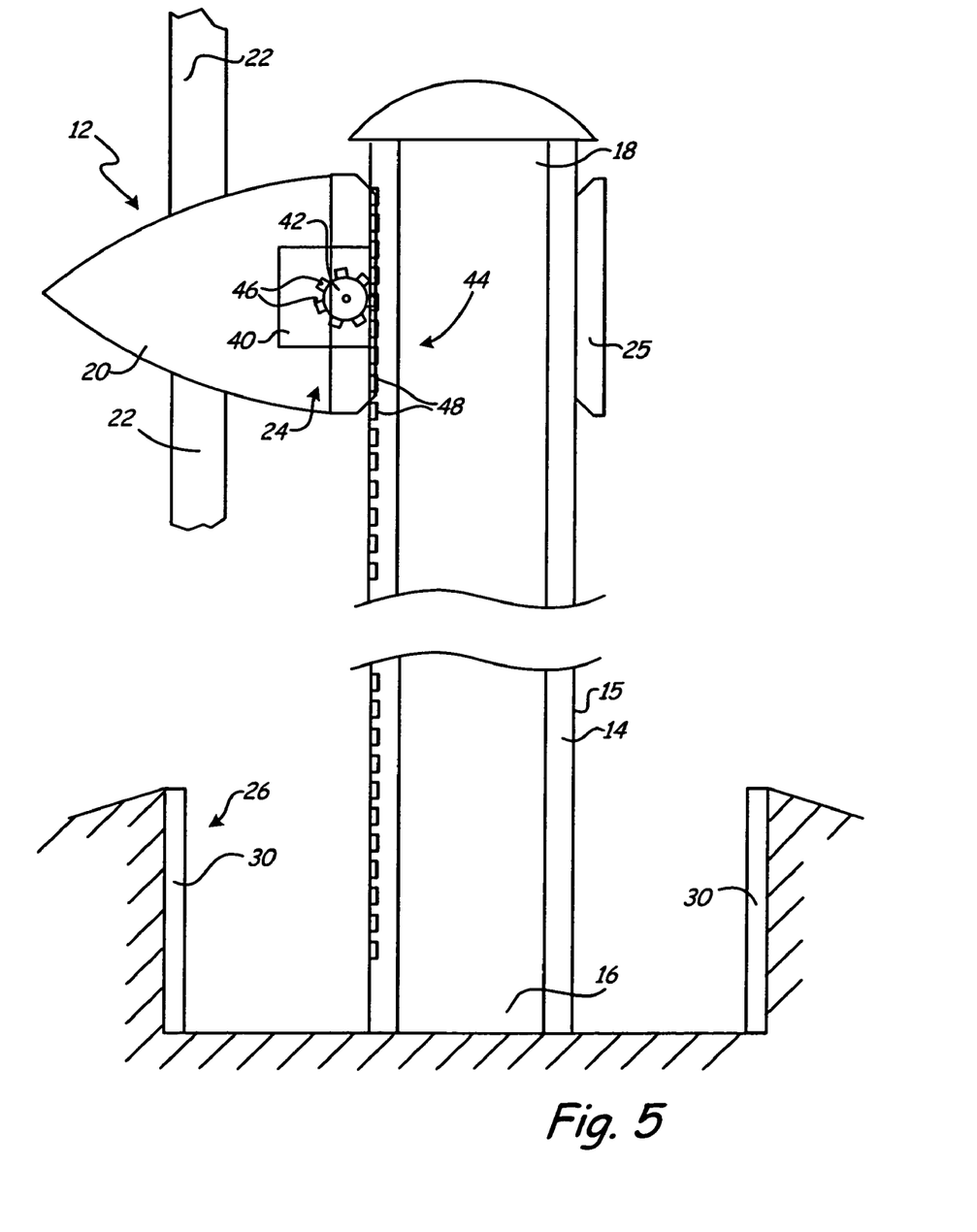
FIG. 5 is a cross-sectional view of an alternative embodiment of the driving device.

FIG. 5 is an alternative embodiment of driving device 24 of the present invention. Driving device 24 includes gear motor 40 attached to gear 42, and gear track 44 extending longitudinally along wind turbine tower 14 from lower end 16 to upper end 18. Gear motor 40 is preferably an electric or hydraulic motor, although any type of motor capable of rotating gear 42 is within the intended scope of this invention. Gear 42 is a circular disk having a plurality of gear teeth 46 around a circumference of gear 42. Gear track 44 includes a plurality of gear teeth slots 48 extending from lower end 16 to upper end 18 of wind turbine tower 14. Gear motor 40 and gear 42 are coupled to sleeve member 25 such that any movement of gear 42 along gear track 44 will cause sleeve member 25 to move along wind turbine tower 14. Therefore, gear motor 40, gear 42, and gear track 44 are configured to raise and lower sleeve member 25, and wind turbine 12 along the length of wind turbine tower 14.

To raise wind turbine 12 up from protective chamber 26, gear motor 40 is activated to drive gear 42 in a clockwise direction. As shown in FIG. 5, gear teeth 46 engage with gear teeth slots 48 as gear motor 40 drives gear 42. When rotating in a clockwise direction, gear teeth 46 crawl up gear track 44, thereby raising sleeve member 25 and attached wind turbine 12 toward upper end 18 of wind turbine tower 14.

To lower wind turbine 12 from upper end 18 of wind turbine tower 14, gear motor 40 is reversed to drive gear 42 in a counter-clockwise direction. When rotating in a counter-clockwise direction, gear teeth 46 crawl down gear track 44, thereby lowering sleeve member 25 and attached wind turbine 12 toward lower end 16 of wind turbine tower 14.

Figure 6:
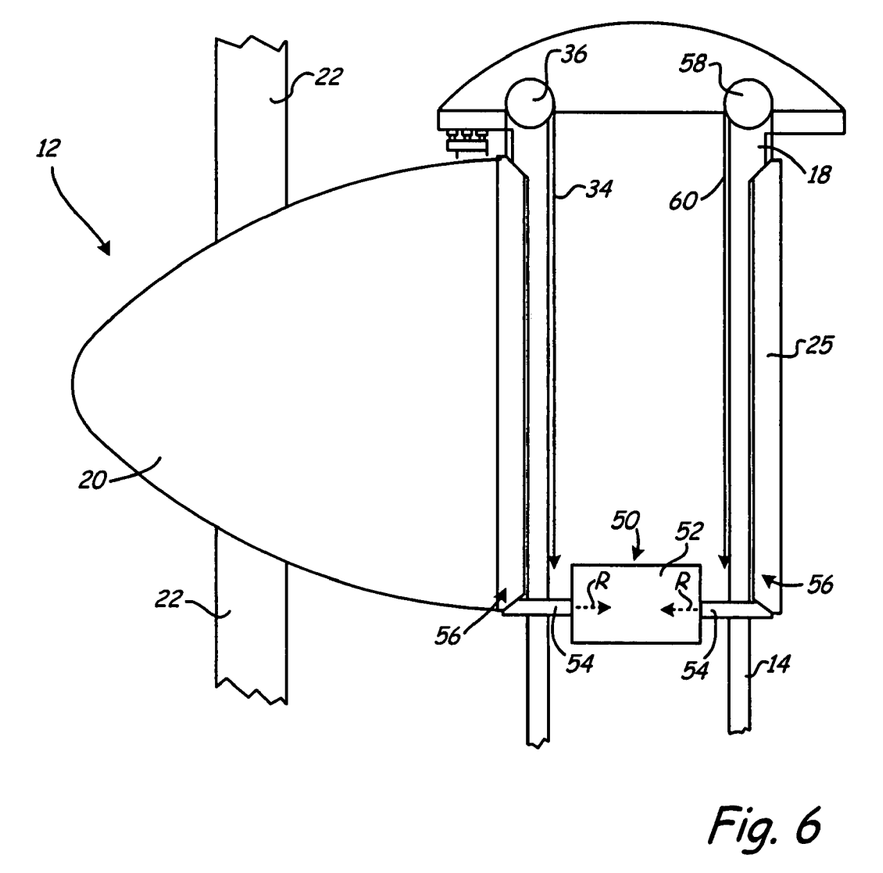
FIG. 6 is a cross-sectional view of the wind turbine tower showing a locking mechanism.

FIG. 6 is a cross-sectional view of wind turbine tower 14 showing locking mechanism 50 near upper end 18. In this embodiment, locking mechanism 50 includes actuating device 52 configured to electrically or hydraulically actuate a plurality of pin members 54 through a corresponding plurality of holes in wind turbine tower 14. Locking mechanism 50 locks wind turbine 12 in the raised position near upper end 18 and prevents sleeve member 25 from moving with respect to wind turbine tower 14. Preventing relative movement results in reduced wear on the components, and provides a safer, more stable wind turbine assembly. Furthermore, locking mechanism 50 relieves a portion of the load on cable 34 by providing support to sleeve member 25 and wind turbine 12.

After driving device 24 raises wind turbine 12 to upper end 18 of wind turbine tower 14, locking mechanism 50 automatically actuates pin members 54 through the corresponding plurality of holes such that pin members 54 engage bottom portion 56 of sleeve member 25. In an alternative embodiment, locking mechanism 50 does not automatically actuate pin members 54. Instead, a wind turbine operator sends a signal to locking mechanism 50 to actuate pin members 54 into their locked position.

To lower wind turbine 12 from upper end 18 of wind turbine tower 14, locking mechanism 50 first retracts pin members 54 within tower 14. The retraction of pin members 54 is shown in FIG. 6 by arrows R. Once pin members 54 are retracted, driving device 24 may once again lower wind turbine 12.

As shown in FIG. 6, driving device 24 may also include second pulley 58 and second cable 60. Similar to cable 34, cable 60 is attached on a first end to winch 32, and on a second end to sleeve member 25. Furthermore, cable 60 also extends longitudinally along wind turbine tower 14 from lower end 16 to upper end 18. At upper end 18 of wind turbine tower 14, second cable 60 engages second pulley 58. Second pulley 58 and second cable 60 provide additional support and stability to sleeve member 25 and wind turbine 12 while raising and lowering wind turbine 12 along wind turbine tower 14. Additional pulleys and cables are beneficial in wind turbine assemblies that include large, heavy components. In fact, the size and weight of a wind turbine will generally determine the number of cables and pulleys necessary in driving device 24 to create a safe and efficient design. Consequently, a driving device with a plurality of cables and pulleys is within the intended scope of this invention.

Figure 7:
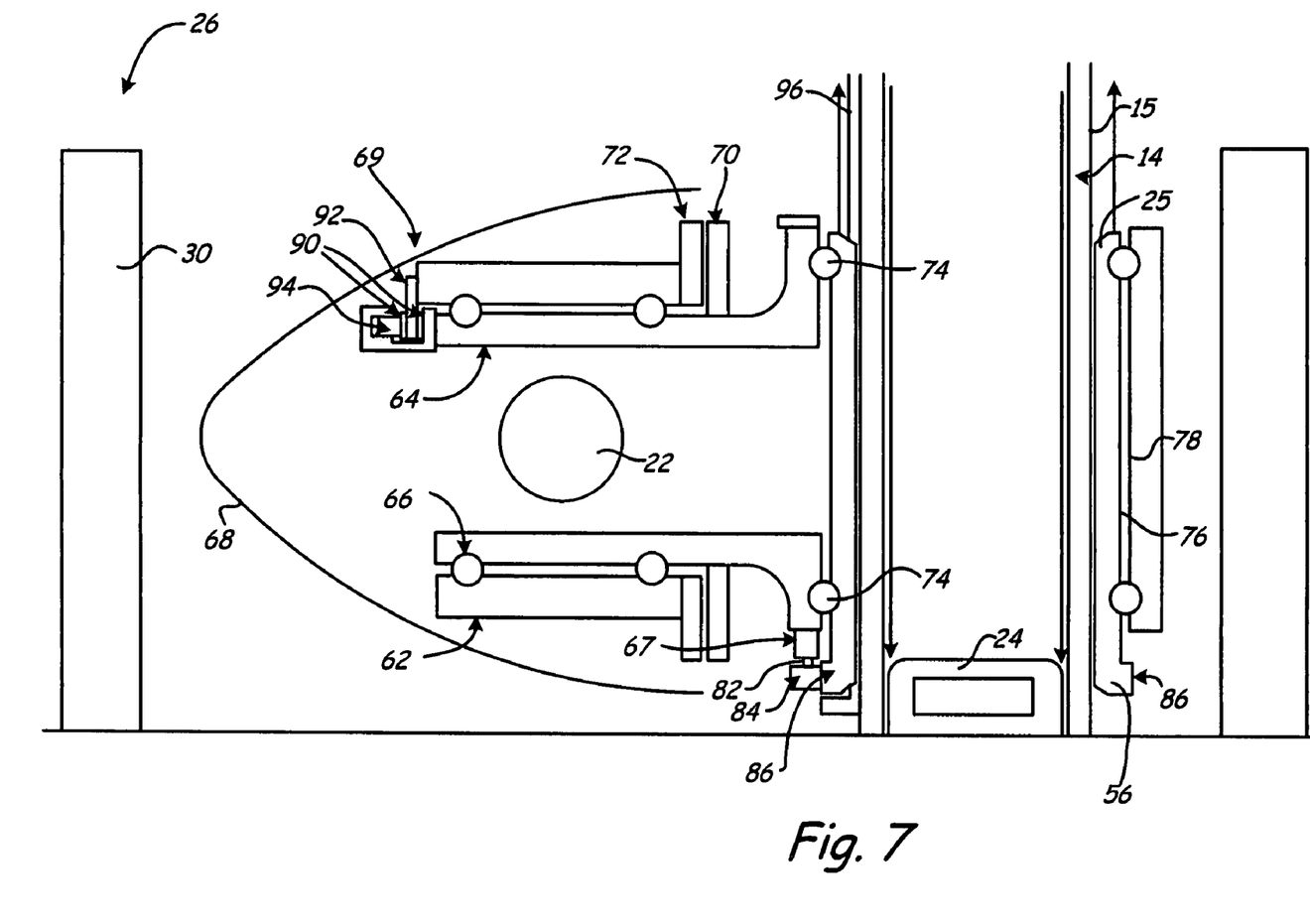
FIG. 7 is a cross-sectional view of a conical turbine housing showing the main components of the wind turbine.

FIG. 7 is a cross-sectional view of wind turbine 12 showing the main turbine components. Wind turbine 12 includes turbine hub 62, turbine shaft 64, turbine bearings 66, yaw motor 67, conical turbine housing 68, brake assembly 69, generator coils 70, and generator magnets 72.

Turbine hub 62 is mounted on turbine shaft 64 by means of turbine bearings 66. Turbine bearings 66 allow turbine hub 62 to rotate around a circumference of fixed turbine shaft 64. As a result, when conical turbine housing 68 of wind turbine 12 is placed in the general direction of oncoming wind, turbine hub 62, which supports turbine blades 22, will rotate around fixed turbine shaft 64. As turbine hub 62 rotates around turbine shaft 64, generator coils 70 and generator magnets 72 generate electrical power.

In FIG. 7, wind turbine 12 is coupled with sleeve member 25 by means of yaw bearings 74. In this embodiment, yaw bearings 74 comprise ball or roller bearings extending around a circumference of sleeve member 25 between outer surface 76 of sleeve member 25 and inner surface 78 of wind turbine 12. Yaw bearings 74 are configured to allow angular rotation of wind turbine 12 with respect to sleeve member 25.

Yaw motor 67, which is coupled to turbine shaft 64, includes yaw motor shaft 82 and yaw drive gear 84. Yaw motor 67 is configured to rotate yaw motor shaft 82, which in turn rotates yaw drive gear 84. Yaw drive gear 84 contains a plurality of drive gear teeth around a circumference of the gear. The drive gear teeth are configured to engage with yaw gear track 86 extending around outer surface 76 of sleeve member 25 near bottom portion 56. When yaw motor shaft 82 is rotated by yaw motor 67, yaw drive gear 84 "crawls" along yaw gear track 86, thereby causing wind turbine 12 to rotate around outer surface 76 of sleeve member 25.

In general, yaw motors and drive gears are used to keep a wind turbine facing into the wind as the wind direction changes. However, in a wind turbine assembly such as that described with reference to FIG. 1, yaw motor 67 serves another important purpose. In order to lower wind turbine 12 into protective chamber 26, the exact position of wind turbine 12 on sleeve member 25 must be controlled. Specifically, prior to lowering wind turbine 12 into protective chamber 26, wind turbine 12 must be rotated along outer surface 76 of sleeve member 25 so that blades 22 will fit within blade storage portions 31. If wind turbine 12 is not properly positioned, blades 22 may hit outer walls 30 of protective chamber 26, potentially causing damage to wind turbine 12. Thus, yaw motor 67 is also used to properly position wind turbine 12 prior to lowering it into protective chamber 26.

Brake assembly 69 of wind turbine 12 is located inside conical turbine housing 68, and includes brake pads 90, brake rotor 92, and piston 94. Brake assembly 69 functions to stop rotation of turbine hub 62 and to hold it in a fixed position. In particular, blades 22 must be fixed in a substantially horizontal position prior to lowering wind turbine 12 into protective chamber 26. Thus, brake assembly 69 provides a way to control the rotational position of blades 22 in order to obtain this required blade position.

Brake pads 90 are coupled to fixed turbine shaft 64, while brake rotor 92 is coupled to turbine hub 62. In this embodiment, piston 94 is hydraulically or electrically actuated to load brake pads 90 against brake rotor 92. The resulting friction between brake pads 90 and brake rotor 92 slows down and eventually stops the rotation of turbine hub 62. In other embodiments, brake assembly 69 may include only a single brake pad, or multiple disks and multiple brake pads can be used to increase brake friction.

As shown in FIG. 7, wind turbine assembly 10 includes guide member 96 extending longitudinally along outer surface 15 of wind turbine tower 14. Guide member 96 couples with a guide member slot on an inside surface of sleeve member 25 such that the guide member slot is slidable along guide member 96.

Figure 8:
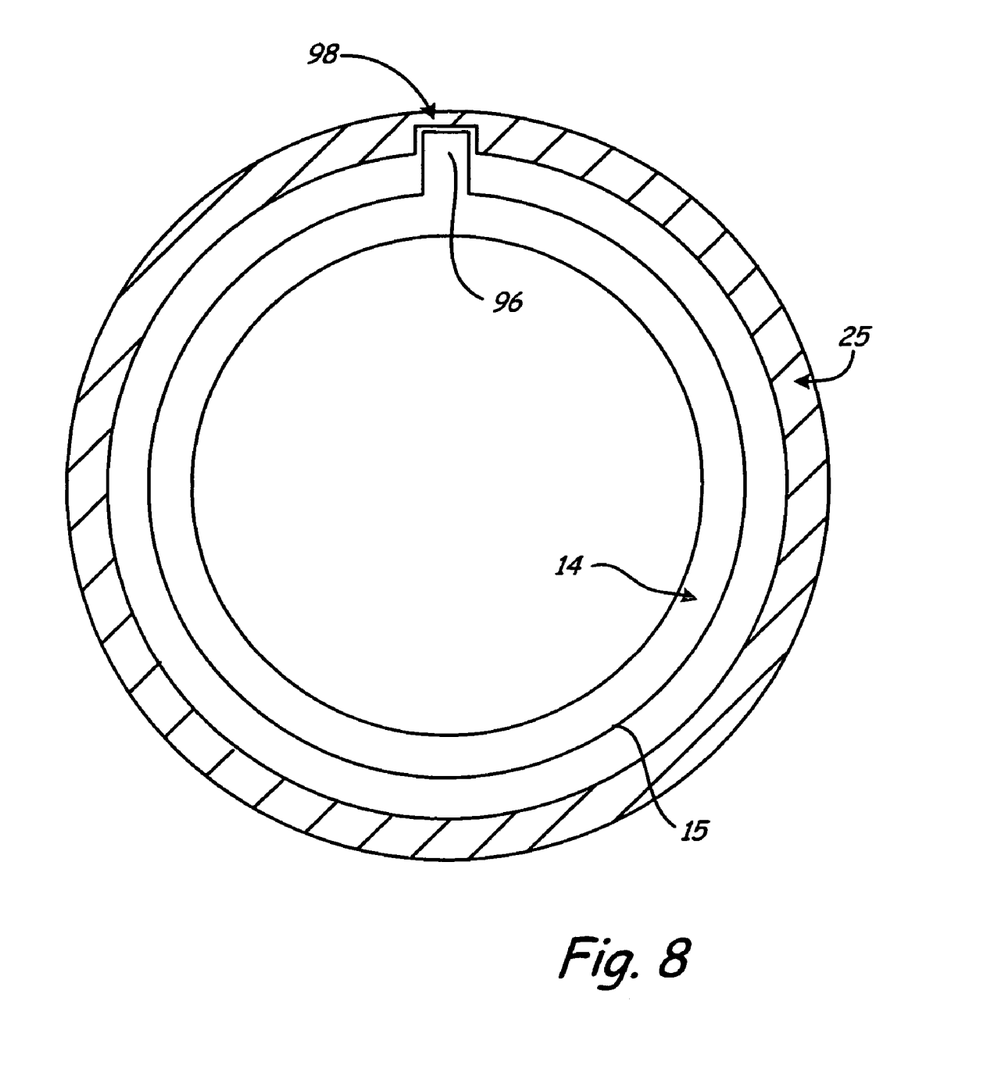
FIG. 8 is a top view of the sleeve member coupled with a guide member that is attached to the wind turbine tower.

FIG. 8 is a top view of sleeve member 25 slidably coupled to wind turbine tower 14. As shown in FIG. 8, guide member slot 98 is a recess cut into an inner diameter of sleeve member 25. Guide member slot 98 engages with and is slidable along guide member 96. The slidable connection between guide member 96 and guide member slot 98 is designed to provide a predetermined path for sleeve member 25 along outer surface 15 of wind turbine tower 14 while wind turbine 12 is raised or lowered by driving device 24. In addition, rotational movement of sleeve member 25 around outer surface 15 of wind turbine tower 14 is prevented by the interaction between guide member 96 and guide member slot 98. Thus, when yaw motor 67 (FIG. 7) drives rotation of wind turbine 12 around sleeve member 25, sleeve member 25 remains stationary while wind turbine 12 is rotated.

In FIGS. 7 and 8, guide member 96 is a rectangular strip of material protruding from outer surface 15 of wind turbine tower 14, and guide member slot 98 is a recess cut into sleeve member 25. In an alternative embodiment, the locations of guide member 96 and guide member slot 98 are reversed such that guide member 96 is located on sleeve member 25, and guide member slot 98 is cut into wind turbine tower 14.

Although the present invention has been described with reference to preferred embodiments, workers skilled in the art will recognize that changes may be made in form and detail without departing from the spirit and scope of the invention.

The invention claimed is:

1. A wind turbine assembly comprising:
    a wind turbine tower;
    a sleeve member slidably coupled to the tower;
    a wind turbine attached to the sleeve member;
    a driving device for moving the sleeve member relative to the wind turbine tower;
    a protective chamber having outer walls positioned around the wind turbine assembly near a lower end of the tower, wherein the wind turbine is positionable within the protective chamber;
    wherein the protective chamber further comprises a chamber lid positionable atop the outer walls to enclose the protective chamber;
    a guiding device for guiding the sleeve member longitudinally along an outer surface of the tower, the guiding device comprising:
        a linear guide member extending longitudinally along the outer surface of the tower; and
        a guide member slot in an inner diameter of the sleeve member wherein the guide member slot couples with and is slidable along the guide member in a linear path defined by the linear guide member.

2. The wind turbine assembly of claim 1, wherein the driving device comprises:
    a pulley disposed at an upper end of the tower;
    a cable attached on a first end to the sleeve member, wherein the cable engages with the pulley and;
    winding means connected to a second end of the cable for moving the sleeve member between the upper end and a lower end of the tower.

3. The wind turbine assembly of claim 2, and further comprising:
    a second pulley disposed at the upper end of the tower; and
    a second cable attached on a first end to the sleeve member and on a second end to the winding means.

4. The wind turbine assembly of claim 1, wherein the driving device comprises:
    a gear motor coupled to the sleeve member;
    a gear track extending longitudinally along the tower from a lower end to an upper end, wherein the gear track includes a plurality of gear teeth slots; and
    a circular gear coupled to and rotatable by the gear motor, wherein the gear includes a plurality of gear teeth around a circumference of the gear, and wherein the plurality of gear teeth is configured to engage with the plurality of gear teeth slots.

5. The wind turbine assembly of claim 4, wherein the gear motor drives the gear in a clockwise direction to raise the sleeve member and the attached wind turbine toward the upper end of the tower, and drives the gear in a counter-clockwise direction to lower the sleeve member and the attached wind turbine toward the lower end of the tower.

6. The wind turbine assembly of claim 1, and further comprising a locking mechanism coupled to the tower that engages with a bottom portion of the sleeve member, wherein the locking mechanism secures the sleeve member at an upper end of the tower and prevents the sleeve member from rotating with respect to the tower.

7. The wind turbine assembly of claim 6, wherein the locking mechanism comprises a plurality of retractable pins.

8. The wind turbine assembly of claim 1, wherein the wind turbine further comprises a brake assembly to stop rotation of the wind turbine and to hold the wind turbine in a fixed position with blades of the wind turbine in a substantially horizontal orientation as the wind turbine is lowered so that the blades are received within a protective chamber.

9. The wind turbine assembly of claim 8, wherein the brake assembly comprises:
   a brake pad coupled to a fixed turbine shaft;
   a brake rotor coupled to a rotatable turbine hub; and
   a piston configured to engage the brake pad and initiate contact between the brake pad and the brake rotor.

10. The wind turbine assembly of claim 8, wherein a bearing is disposed between the sleeve member and the wind turbine to allow angular rotation of the wind turbine with respect to the sleeve member.

11. The wind turbine assembly of claim 10, and further comprising a yaw drive motor coupled to the wind turbine to rotate the wind turbine with respect to the sleeve member, wherein the yaw drive motor rotates the wind turbine to a predetermined position prior to lowering of the wind turbine.

12. A wind turbine assembly comprising:
   a wind turbine tower;
   a sleeve member slidably coupled to the tower;
   a wind turbine attached to the sleeve member;
   a protective chamber having outer walls positioned around the wind turbine assembly near a lower end of the tower, wherein the wind turbine is positionable within the protective chamber;
   wherein the protective chamber further comprises a chamber lid positionable atop the outer walls to enclose the protective chamber; and
   a driving device for moving the sleeve member relative to the wind turbine tower into and out of the protective chamber.

13. A wind turbine assembly comprising:
   a wind turbine tower;
   a sleeve member slidably coupled to the tower;
   a wind turbine attached to the sleeve member;
   a driving device for moving the sleeve member relative to the wind turbine tower;
   a protective chamber having outer walls positioned around the wind turbine assembly near a lower end of the tower, wherein the wind turbine is positionable within the protective chamber;
   wherein the protective chamber further comprises a chamber lid positionable atop the outer walls to enclose the protective chamber;
   a brake assembly to stop rotation of the wind turbine and to hold the wind turbine in a fixed position with blades of the wind turbine in a substantially horizontal orientation as the wind turbine is lowered so that the blades are received within the protective chamber;
   a bearing disposed between the sleeve member and the wind turbine to allow angular rotation of the wind turbine with respect to the sleeve member; and
   a yaw drive motor coupled to the wind turbine to rotate the wind turbine with respect to the sleeve member, wherein the yaw drive motor rotates the wind turbine to a predetermined position prior to lowering of the wind turbine.

\* \* \* \* \*